Oct. 15, 1935.  O. M. ANDERSON ET AL  2,017,431
GUARD FOR ELECTRIC FANS
Filed Feb. 24, 1933  2 Sheets-Sheet 1
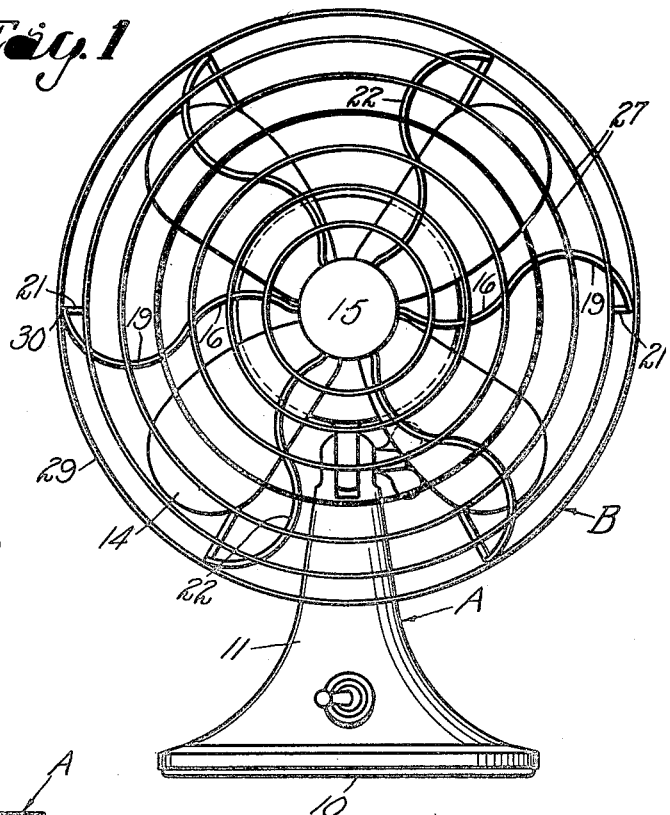
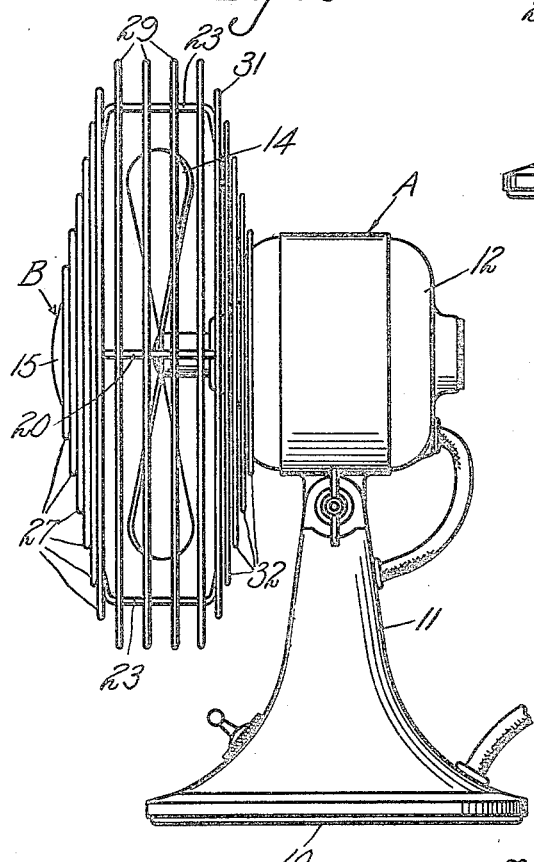
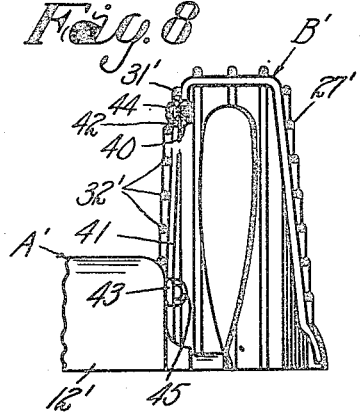
Inventors
Oscar M. Anderson
Fred W. Juengst
By H. Clay Lindsey
Attorney Oct. 15, 1935. O. M. ANDERSON ET AL 2,017,431
GUARD FOR ELECTRIC FANS
Filed Feb. 24, 1933 2 Sheets-Sheet 2
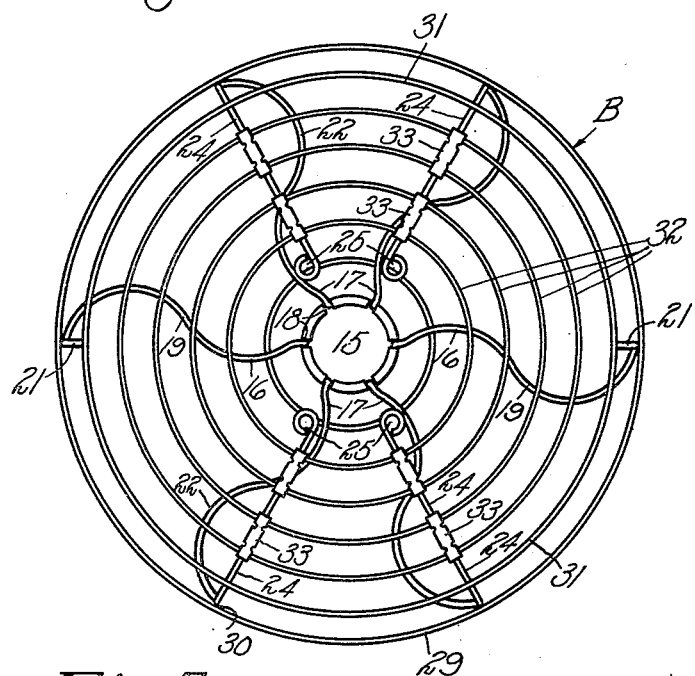
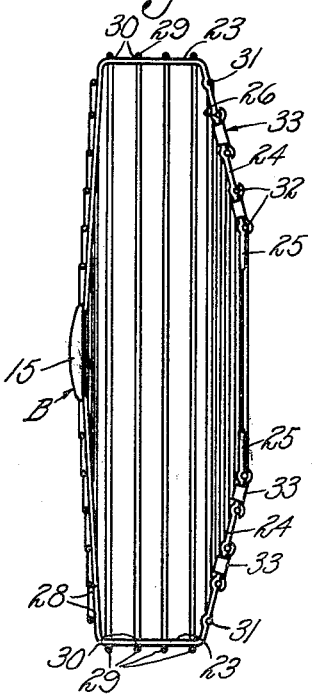
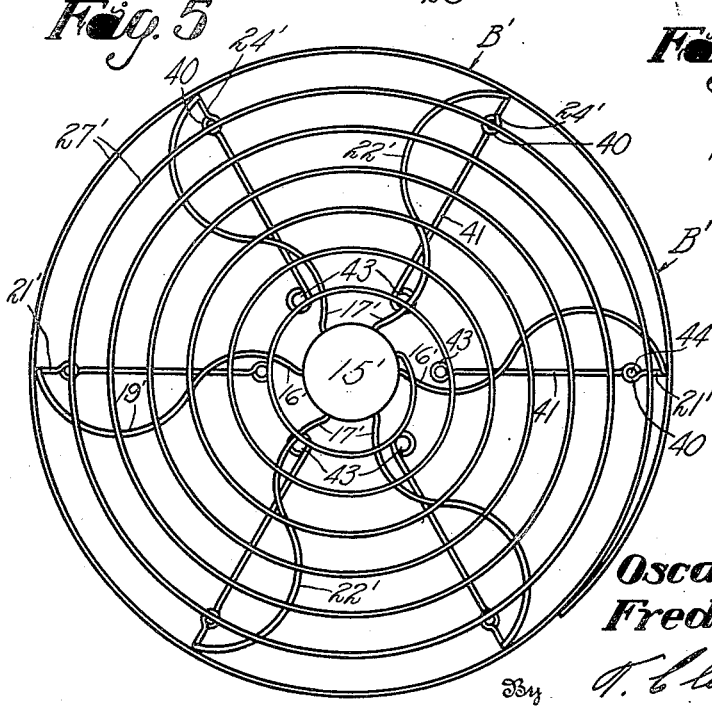
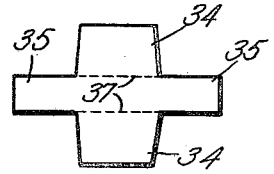
Inventors
Oscar M. Anderson
Fred W. Juengst
By T. Clay Lindsey
Attorney Patented Oct. 15, 1935

2,017,431

UNITED STATES PATENT OFFICE 2,017,431

GUARD FOR ELECTRIC FANS

Oscar M. Anderson and Fred W. Juengst, New Britain, Conn., assignors to Landers, Frary & Clark, New Britain, Conn., a corporation of Connecticut Application February 24, 1933, Serial No. 658,335

2 Claims. (Cl. 230—275)

The present invention relates to electric fans of the so-called screw type in which the air current is forced forwardly in a direction substantially or approximately parallel to the axis of the impeller or rotary fan, and is more particularly concerned with guards for fans of this type. The improvements of the present invention find particular application to fans adapted for household and similar uses.

It is well known that heretofore there have been provided guards which protect the fan blades from damage in case the fan falls but such guards do not prevent the hands and fingers of persons getting in the path of the rotating blades. Guards have also been proposed for preventing the fingers of persons coming in contact with the rotating fan blades but such proposed guards have not proved practical because of the very serious drawback that they unduly interfere with the air stream from the fan blades and thus defeat the primary object of a fan.

It is an object of this invention to overcome the above noted disadvantages by providing an improved guard for fans of this type which will prevent anyone, including children, from getting their fingers into the path of the rotating fan blades, and at the same time will not interfere, to any appreciable extent, with the air stream from the fan. With this thought in mind, and since the air flows from the fan blades in a more or less circular stream, the present invention contemplates providing an improved guard including a plurality of rings which are concentrically arranged with respect to one another and about the axis of rotation of the fan blades.

It is another object of the present invention to provide an improved guard of this kind which allows the air to flow to the fan blades without being unduly baffled or obstructed.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein I have shown, for illustrative purposes, one of the many embodiments which the present invention may take:

Fig. 1 is a front elevation of an electric fan with a guard constructed in accordance with the present invention attached thereto;

Fig. 2 is a side elevation of the same;

Fig. 3 is a rear elevation of the guard shown in Fig. 1 but detached from the fan;

Fig. 4 is a transverse vertical sectional view of the guard shown in Figs. 1 to 3;

Fig. 5 is a front elevation of another embodiment of our invention;

Fig. 6 is an enlarged detail view of one of the clips for securing the back rings in place on the frame of the guard;

Fig. 7 is a view showing a blank from which the clip may be formed; and

Fig. 8 is a fragmentary transverse vertical sectional view of the guard shown in Fig. 5.

Referring more particularly to the drawings, A generally indicates an electric fan, B generally indicates the embodiment of our improved guard shown in Figs. 1 to 4, both inclusive, and B' generally indicates the embodiment of our improved guard shown in Figs. 5 and 8.

The electric fan A may be of the type customarily used in houses, offices, et cetera and includes a base 10, a standard 11 arising therefrom, and an electric motor casing 12 mounted on the upper end of the standard 11 and enclosing an electric motor, not shown. The electric motor is provided with the usual shaft, not shown, upon which a plurality of fan blades 14 are mounted in the ordinary way so as to be rotated by the motor shaft. While four such blades are shown in the drawings, it is to be understood that any desired number may be employed. These blades 14 are of the character usually employed on fans of this general type and are so shaped and arranged that the air stream therefrom, when the blades are in motion, takes a path which is substantially parallel to the axis of rotation of the blades 14 and moves forwardly therefrom. The air within the stream circulates or has a rotary movement about the axis of the stream.

The fan guard B, shown in Figs. 1 to 4, includes a supporting frame comprising a hub 15 to which a plurality of spokes 16 and 17 are secured, as at 18. While six such spokes are shown in the drawings, it is to be understood that any desired number may be utilized. The spokes 16, being two in number in the present illustrated disclosure, may be secured to the hub 15 at diametrically opposite points and each spoke 16 comprises an arm 19 extending substantially radially and slightly rearwardly from the hub. Each arm 19 is shown as being substantially S-shaped to impart strength and a pleasing appearance to the structure. However, the arms 19 may be given any other suitable configuration. Each spoke 16 has extending rearwardly from its arm 19 a substantially straight portion 20 and extending inwardly and rearwardly from the free end of the portion 20 is a free end portion 21.

Each spoke 17, of which four are shown in the present disclosure, includes an arm 22 and a straight portion 23 similar to the arms 19 and straight portions 20 of the spokes 16. The straight portion 23 of each spoke 17 has extending inwardly and rearwardly therefrom a rod 24 the inner free end of which is provided with an eye 25. Each rod 24 may be provided with a plurality of spaced apart rearwardly facing substantially semi-circular seats 26 which may be arranged in pairs.

A plurality of rings 27 may be secured, as at 28, by welding or the like, to the arms 19 and 22 of the spokes 16 and 17 respectively. It is noted that, due to the rearward inclination of the arms 19 and 22 and that each ring, beginning with the one attached to the spokes 16 and 17 at points closest to the hub 15, is smaller in diameter than the next succeeding one, the rings are arranged in rearwardly stepped relation, as may be clearly seen in Fig. 2. A plurality of rings 29 having substantially the same diameter may be secured by welding or the like, as at 30, to the straight portions 20 and 23 of the spokes 16 and 17 respectively. A ring 31 may be permanently secured, as by welding, to the free end portion 21 of the spokes 16 and the rods 24.

Rings 32 may be detachably secured to the rods 24 by means of clips 33, shown more clearly in Figs. 4 and 6. Due to the rearward inclination of the rods 24 and the fact that each ring of the rings 32, beginning with the ring secured to the rods 24 nearest the free ends of said rods, is of less diameter than the next succeeding one, the rings 32 are arranged in forwardly stepped relation.

The seats 26 on each rod 24 may be arranged in pairs, as is clearly shown in Fig. 6, and two adjacent rings 32 may be received by the respective seats of the corresponding pair of seats 26 of each rod 24. A clip 33 which may comprise a pair of oppositely extending wings 34 and a pair of oppositely extending fingers 35 each having a substantially semi-circular seat 36 may be then secured to each rod 24 between the seats of a pair of seats 26. Each clip may be secured to a rod 24 by bending the wings 34 thereof along score lines 37 so that the wings encircle the rods 24 and the fingers 35 engage the respective rings 32 with the seats 36 receiving the rings 32 and being disposed in opposed relation to the respective seats 26 of the rods 24. The rings are thus securely held in place upon the rods 24 and yet may be quickly and easily removed therefrom by simply spreading apart the wings 34 of the clips 33 and removing the clips.

In Figs. 1 to 4, the rings 27 at the front of the guard are formed from separate pieces of wire or the like but in the embodiment disclosed in Figs. 5 and 8 these rings may be formed by the convolutions 27' of an integral continuous piece of wire or the like. With this exception and the hereinafter noted differences, the embodiment of the invention shown in Figs. 5 and 8 is similar to that disclosed in Figs. 1 to 4, and corresponding parts thereof are marked with the same reference characters, primed. In this embodiment, the free end portions 21' and the rods 24' terminate inwardly of the ring 31' in interiorly screw threaded eyes 40. A plurality of bars 41 are provided to which the rings 32' may be permanently secured. The opposite ends of each bar 41 terminate in eyes 42 and 43 respectively; the eyes 42 being interiorly screw threaded and adapted to be alined with the eyes 40 when the parts are in proper position. When the respective eyes 40 and 42 are in alinement, they receive a screw 44. The eyes 43 may receive screws 45 which may be employed for holding the front plate of the housing 12' in place.

To assemble our improved guard B upon the fan A, the rings 32 may be placed upon the forward end of the motor housing 12 before the fan blades 14 are put in place. The blades 14 may then be mounted in place. The guard B may be then threaded over the blades 14 until the eyes 25 of the rods 24 are alined with the usual screw openings in the front plate of the motor housing 12. The screws, usually employed for holding the front plate of the housing 12 in place, are also passed through the eyes 25 of the rods 24 so that it is apparent that the guard is held in place by these screws. The two outermost rear rings 32 may be then respectively seated in the outermost pair of seats 26 on the respective rods 24. Clips 33 may then be applied in the manner described above. The other rings 32 may then be mounted upon the rods 24 in a similar manner.

To mount the guard B' shown in Figs. 5 and 8 upon the fan A', the bar 41 with the rings 32' attached thereto may be first secured to the housing 12' by passing the screws 45 through the eyes 43 of the bars 41. The fan blades may then be put in place, and the front and circumferential portions of the guard B' may then be placed about the blades with the respective eyes 40 and 42 in alinement. The screws 44 may then be put in place in the eyes 40 and 42 and the guard B' is thus securely held in place.

It will be noted that our improved guard has a front portion, a circumferential portion, and a rear portion, each of the portions being formed of a plurality of rings concentrically arranged with respect to one another and to the axis of rotation of the impeller or fan, and that these rings are spaced apart sufficiently to prevent undue retardation of the flow of air to and from the fan blades, but are positioned sufficiently close to make it very difficult for anyone to place his fingers between the guard wires and into the path of movement of the fan blades. The rings may, of course, be spaced apart at any desired distance to accomplish these results, but preferably they are spaced apart about one-half inch. The impeller or fan blade being of the so-called screw type, will draw the air in from the back, and impel it forwardly in a path generally parallel to the axis of rotation of the impeller and, due to the rotation of the helically arranged blades, the medium in these currents is given more or less a rotary or circular movement about the axis of the fan. With our improved arrangement of guard, the rotary or circulatory movement of the air is not impeded, to any substantial extent, and the air may be drawn into the fan from the back and impelled by the fan forwardly in the most effective manner. Whenever the term "ring" is used, it is intended to include the convolutions 27' shown in the spiral arrangement of Fig. 5.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. A guard for a rotatable fan blade structure comprising front, circumferential and rear sections, said front and rear sections comprising an inner ring concentric to the blade structure, an outer ring, a plurality of intermediate rings disposed concentrically of said inner and outer rings and in spaced relation thereto, said intermediate rings being also spaced one from the other, means extending from the inner to the outer rings and secured thereto and to the intermediate rings for holding the rings in concentric relation, said circumferential section comprising a plurality of spaced apart rings, and means secured to said rings and integral with said first means for holding the rings in spaced apart relation.

2. A guard for a rotatable fan blade structure comprising front, circumferential and rear sections, said front and rear sections comprising an inner ring concentric to the blade structure, an outer ring, a plurality of intermediate rings disposed concentrically of said inner and outer rings and in spaced relation thereto, said intermediate rings being also spaced one from the other, front bars secured to the rings of the front section for holding said rings in concentric relation, rear bars secured to the rings of the rear section for holding said rings in concentric relation, means carried by said rear bars for holding said rear section on the frame of a fan and concentric to the blade structure, said circumferential section comprising a plurality of spaced apart rings, and circumferential bars secured to the rings of the circumferential section and integral with said front and rear bars for holding the circumferential rings in spaced relation, and for maintaining said front section in forwardly spaced relation to said rear section.

OSCAR M. ANDERSON.
FRED W. JUENGST.